United States Patent Office 2,776,308
Patented Jan. 1, 1957

2,776,308

OXIDATION OF WAXY HYDROCARBONS WITH PREPARATION OF CATALYST IN SITU

John Walter Nelson, Lansing, Ill., assignor to Sinclair Refining Company, New York, N. Y., a corporation of Maine No Drawing. Application February 16, 1954, Serial No. 410,710

11 Claims. (Cl. 260—451)

My invention relates to the oxidation of waxy petroleum fractions and particularly to a novel method of preparing a catalyst in situ in the oxidation of such fractions.

In the oxidation of a waxy petroleum fraction to produce fatty acids, for example, the fraction is subjected to large amounts of air at an elevated temperature for about 20 hours or more in the presence of a manganese and alkali metal containing oxidation catalyst, for example, potassium permanganate. For an oxidation catalyst to be effective it must be finely dispersed throughout the waxy fraction. When potassium permanganate is used as the catalyst, this is accomplished by dissolving the salt in a solvent, for example water, prior to its addition to the waxy fraction. In one procedure, the solvent is carefully evaporated from either the total catalyst charge or a portion thereof. In the latter case, the catalyst concentrate is added to the reaction mass as required. The preparation of a catalyst concentrate, however, is hazardous as it often catches on fire. Because of this, the preferred procedure has been to prepare the catalyst in situ. In this procedure, the catalyst solution is added to the waxy fraction at a temperature below the boiling point of the solvent. The solvent is then evaporated by slowly raising the temperature of the reaction mixture with agitation. In this procedure, however, a great deal of foaming results and extreme care must therefore be exercised as superheating only a small portion of the solvent may cause the reaction vessel to overflow.

I have found in the oxidation of waxy petroleum fractions in the presence of a manganese and alkali metal containing oxidation catalyst that the catalyst can be prepared in situ without hazard or excessive foaming by adding a solution of the catalyst in a solvent to the waxy fraction while maintaining the fraction at a temperature substantially above the boiling point of the solvent. On contact of the catalyst solution with the waxy fractions, the solvent is rapidly flashed off and the catalyst is present in such great dilution that surprisingly it does not react violently with the waxy material. Foaming is kept to a minimum and the catalyst is thus prepared more rapidly than the conventional slow solvent evaporation method. Moreover, the oxidation rate is increased and product color is improved.

By a waxy petroleum fraction, I mean fractions obtained in the separation of the waxy components of crude oil such as slack wax, crude scale wax, paraffin wax and microcrystalline wax, including petrolatum, as well as foots oil fractions obtained in the production of such waxes and wax fractions. My method is particularly advantageous in the oxidation of foots oil fractions obtained from the sweating or the solvent, e. g. methylethyl ketone, deoiling of slack wax, and microcrystalline wax fractions such as petrolatum.

According to the method of my invention, I prepare a solution of the catalyst, for example, potassium permanganate, in a solvent, for example, water. Preferably the water is warm to facilitate solution, for example, about 150 to 170° F. The catalyst solution is then added slowly to an agitated waxy petroleum fraction which is maintained at a temperature substantially above the boiling point of the solvent. The solvent is flashed off during the catalyst addition with a minimum of foaming. To facilitate quick flashing of the solvent, it is desirable to maintain the waxy fraction at a temperature substantially above the boiling point of the catalyst solvent, for example, when water is used as the solvent, it is desirable to maintain the temperature at above about 250° F. and preferably at about 300 to 360° F. Particularly advantageous results are obtained by maintaining the temperature at about 330 to 360° F. Air or oxygen is then introduced into the waxy material and catalyst mixture until the oxidation is completed. The catalyst is efficiently dispersed so that oxidation is more rapid and product color is improved over previous procedures. Advantageously, in the oxidation a small amount of "seed," i. e. material from a previous reaction, is present to facilitate the starting of the reaction.

The amount of permanganate catalyst used may vary from about 0.2 to 1.7 weight percent of the hydrocarbon. Preferably, about 0.85 weight percent is used. Although water is the preferred solvent for the catalyst, organic solvents such as ketones, for example acetone or methylethyl ketone, or mixtures thereof with water may be used.

The method of my invention will be further illustrated by the following examples in which the oxidation of waxy petroleum fractions in the presence of a potassium permanganate catalyst using the conventional procedure of catalyst preparation in situ and the procedure of my invention are compared.

Example I

In this example, foots oil fractions obtained from slack wax were oxidized. A solution of potassium permanganate in water was prepared by dissolving 0.85 weight percent potassium permanganate in five times its weight of warm water. Foots oil fractions containing about 0.85 weight percent of "seed," a product from a previous reaction, were heated to varying temperatures.

Using the conventional procedure, the catalyst solution, at about 150 to 170° F., was added to an agitated foots oil fraction and seed heated to a temperature below the boiling point of water in one minute. The foots oil fraction was maintained at 200° F. during the addition of the catalyst solution, which is a somewhat higher temperature than is used in conventional procedures. The foots oil was then heated slowly over a period of 1.5 hours until a temperature of 300° F. was reached to remove the water. Oxygen was then introduced for 25 hours. The induction time was 25 minutes. The product has a saponification number of 271, an acid number of 162 and 27 percent unsaponifiables. The increase in saponification number per hour was 10.8 and the yield of solid product based on the foots oil charge was 88 percent.

Using the method of my invention, the catalyst solution, at about 150 to 170° F., was added to the agitated foots oil fraction and seed heated to a temperature of 330 to 360° F. Water was flashed off during the catalyst addition. Only a moderate amount of foam developed. Oxygen was then introduced for 24.5 hours. The induction time was 10 minutes. The product had a saponification number 338, an acid number of 222 and 17 percent unsaponifiables. The increase in saponification number per hour was 13.8 and the yield of solid product based on the foots oil was 88 percent.

The results show that in the method where the catalyst solution was added to the foots oil heated to a temperature substantially above the boiling point of water, i. e. 330 to 360° F., the product had a much higher degree of oxidation. In 24.5 hours of oxidation time the saponification number was about 24 percent higher than the product of the conventional procedure and the unsaponifiables were 37 percent less. Moreover, product color was improved.

*Example II*

In this example, petrolatum was oxidized.

Using the conventional procedure, the solution of potassium permanganate in water of Example I was added to agitating petrolatum and seed at a temperature of about 190° F. The mixture was heated slowly to 300° F. over 1.25 hours to remove the water. A substantial amount of foaming occurred. Oxygen was then introduced into the mixture for 63.5 hours. The product had a saponification number of 267 and an acid number of 162. The increase of saponification number per hour was 4.2 and the yield of solid product based on the petrolatum charged was 97 percent.

Using the method of my invention, the catalyst solution at 150 to 170° F. was added to the agitating petrolatum and seed at 300 to 320° F. over a period of 40 minutes. Water was flashed off during the catalyst addition. The induction time was 5 minutes. Oxygen was introduced for 30.25 hours. The product had a saponification number of 273 and an acid number of 173. The increase in saponification number per hour was 9.1 and the yield of solid product based on the petrolatum charged was 85 percent. In a similar run, the catalyst solution at 180° F. was added to the agitating petrolatum and seed at 300 to 320° F. over 15 minutes. The increase in saponification number per hour was 10.4.

The results show the much higher increase in saponification number per hour obtained by the method of my invention.

I claim:

1. In the oxidation of waxy petroleum fractions in the presence of a manganese and alkali metal containing oxidation catalyst, the method of preparing the catalyst in situ which comprises adding a solution of the catalyst in a solvent to the waxy petroleum fraction while maintaining the fraction at a temperature substantially above the boiling point of the solvent to flash off solvent as it is added.

2. The method of claim 1 in which the catalyst is potassium permanganate.

3. The method of claim 1 in which the waxy fraction is a foots oil fraction.

4. The method of claim 1 in which the waxy fraction is a microcrystalline wax fraction.

5. In the oxidation of waxy petroleum fractions in the presence of a manganese and alkali metal containing oxidation catalyst, the method of preparing the catalyst in situ which comprises adding a solution of the catalyst in water to the waxy petroleum fraction while maintaining the fraction at a temperature substantially above the boiling point of water to flash off water as it is added.

6. The method of claim 5 in which the catalyst is potassium permanganate.

7. The method of claim 5 in which the waxy fraction is a foots oil fraction.

8. The method of claim 5 in which the waxy fraction is a microcrystalline wax fraction.

9. In the oxidation of waxy petroleum fractions in the presence of a potassium permanganate catalyst, the method of preparing the catalyst in situ which comprises adding a solution of the catalyst in water to the waxy petroleum fraction while maintaining the fraction at a temperature above about 250° F. to flash off water as it is added.

10. In the oxidation of a foots oil fraction in the presence of a potassium permanganate catalyst, the method of preparing the catalyst in situ which comprises adding a solution of the catalyst in water to the foots oil fraction while maintaining the foots oil fraction at a temperature above about 250° F. to flash off water as it is added.

11. In the oxidation of a microcrystalline wax friction in the presence of a potassium permanganate catalyst, the method of preparing the catalyst in situ which comprises adding a solution of the catalyst in water to the microcrystalline wax fraction while maintaining the microcrystalline wax fraction at a temperature above about 250° F. to flash off water as it is added.

References Cited in the file of this patent

UNITED STATES PATENTS

| Number | Name | Date |
|---|---|---|
| 2,216,222 | Beller et al. | Oct. 1, 1940 |
| 2,274,057 | Gerlicher | Feb. 24, 1942 |
| 2,391,236 | Hirsch | Dec. 18, 1945 |
| 2,682,553 | Kirk et al. | June 29, 1954 |